United States Patent
Florman et al.

(10) Patent No.: US 7,117,244 B2
(45) Date of Patent: *Oct. 3, 2006

(54) TECHNIQUES FOR LOAD DISTRIBUTION PROCESSING FOR CALL CENTERS AND OTHER PROCESSING SYSTEMS

(75) Inventors: Bruce Florman, Noblesville, IN (US); Donald E. Brown, Indianapolis, IN (US)

(73) Assignee: Interactive Intelligence, Inc., Indianapolis, ID (US)

( * ) Notice: Subject to any disclaimer, the term of this patent is extended or adjusted under 35 U.S.C. 154(b) by 843 days.

This patent is subject to a terminal disclaimer.

(21) Appl. No.: 10/233,024

(22) Filed: Aug. 31, 2002

(65) Prior Publication Data

US 2003/0088660 A1    May 8, 2003

Related U.S. Application Data

(63) Continuation-in-part of application No. PCT/US01/04734, filed on Feb. 14, 2001, which is a continuation of application No. 09/516,084, filed on Mar. 1, 2000, now Pat. No. 6,377,975.

(51) Int. Cl.
*G06F 15/16* (2006.01)

(52) U.S. Cl. .................. 709/203; 709/223; 709/226; 709/229

(58) Field of Classification Search ................ 709/203, 709/223, 226, 229
See application file for complete search history.

(56) References Cited

U.S. PATENT DOCUMENTS

| | | | |
|---|---|---|---|
| 4,530,051 A | 7/1985 | Johnson et al. | |
| 5,473,608 A | 12/1995 | Gagne et al. | |
| 5,603,029 A | 2/1997 | Aman et al. | |
| 5,644,720 A | 7/1997 | Boll et al. | |
| 5,745,703 A | 4/1998 | Cejtin et al. | |
| 5,774,668 A | 6/1998 | Choquier et al. | |
| 5,790,789 A | 8/1998 | Suarez | |
| 5,828,843 A | 10/1998 | Grimm et al. | |
| 5,828,847 A | 10/1998 | Gehr et al. | |
| 5,867,657 A | 2/1999 | Bolosky et al. | |
| 5,915,095 A | 6/1999 | Miskowiec | |
| 5,924,097 A | 7/1999 | Hill et al. | |
| 5,930,780 A | 7/1999 | Hughes et al. | |
| 5,931,900 A | 8/1999 | Notani et al. | |
| 5,951,634 A | 9/1999 | Sitbon et al. | |
| 5,951,694 A | 9/1999 | Choquier et al. | |

(Continued)

OTHER PUBLICATIONS

*Load Distribution for COBRA Environments*, Gunther Rackl, Jan. 15, 1997.

(Continued)

*Primary Examiner*—Zarni Maung
*Assistant Examiner*—Nghi Tran
(74) *Attorney, Agent, or Firm*—Woodard, Emhardt, Moriarty, McNett & Henry LLP

(57) ABSTRACT

A system of networked computers is disclosed having a number of servers and a number of clients. The clients are each provided with access to server selector service and the servers are each provided with access to a server reporter service. The server selector service is operable to obtain server processing load information from the server reporter service. The server selector service is responsive to a client activation request for a software task designated for server execution to select two or more servers to interrogate for server processing load information and designate one of the servers to execute the software task based on the server processing load information obtained by this interrogation.

19 Claims, 7 Drawing Sheets

U.S. PATENT DOCUMENTS

| | | |
|---|---|---|
| 5,966,531 A | 10/1999 | Skeen et al. |
| 5,978,829 A | 11/1999 | Chung et al. |
| 5,991,808 A | 11/1999 | Broder et al. |
| 6,167,427 A | 12/2000 | Rabinovich et al. |
| 6,377,975 B1 | 4/2002 | Florman |

OTHER PUBLICATIONS

*Use AppCenter Server or COM and MTS for Load Balancing Your Component Servers,* Timothy Ewald, Jan. 2000.
*DCOM Overview,* Saga Software, Inc., 1996.
*COBRA and DCOM: How Each Works,* David F. Carr, Web Week, vol. 3, No. 7, Mar. 24, 1997.

TECHNIQUES FOR LOAD DISTRIBUTION PROCESSING FOR CALL CENTERS AND OTHER PROCESSING SYSTEMS

CROSS-REFERENCE TO RELATED APPLICATIONS

This application is a continuation-in-part of International Patent Application Number PCT/US01/04734, filed Feb. 14, 2001, which claims priority to and is a continuation of U.S. patent application Ser. No. 09/516,084 filed Mar. 1, 2000 (now U.S. Pat. No. 6,377,975), all of which are hereby incorporated by reference.

BACKGROUND

The present invention relates to computerized processing, and more particularly, but not exclusively, relates to distributing processing tasks among a number of networked computers.

With the advent of computer networks, interest has grown in the efficient distribution of processing tasks among the resources coupled to the network. The ability to balance processing load among these resources has become one focus of distributed processing efforts. This interest is especially acute in the area of computer networks utilized to manage various communications, such as telephone calls, voice mail, e-mail, telefaxes, electronic chats, and the like.

Furthermore, it is occasionally desired to apply processing load balancing to legacy applications and components for which load balancing was not provided. Unfortunately, the addition of current distributed processing and corresponding load balancing mechanisms to legacy applications often requires undesirable modifications. Thus, there is a demand for further contributions in this area of technology.

SUMMARY

One form of the present invention is a unique processing load distribution technique. Other forms include unique systems and methods to balance processing load among a number of servers of a computer network.

A further form includes operating a computer system that has several clients and servers, and generating an activation request with one of the clients for a software task that has been designated for server execution. One or more of the servers are interrogated by this client and the client is provided information corresponding to processing load for each of the servers interrogated. One of the servers is selected to execute the task as a function of this information.

Still further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
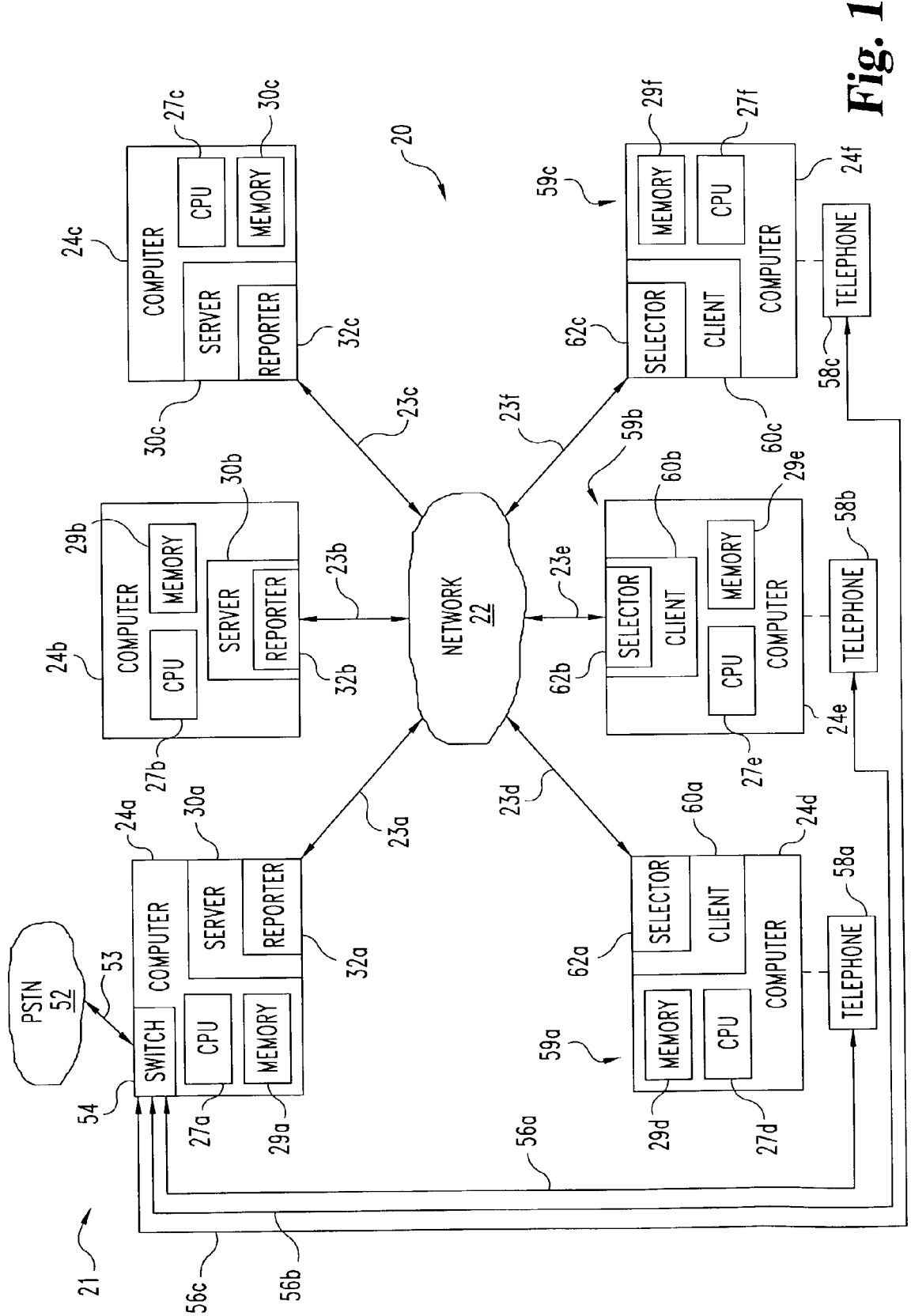
FIG. 1 is a schematic view of a computer system according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 schematically illustrates computer system 20 of one embodiment of the present invention. System 20 includes computer network 22 coupling together a number of computers 24a, 24b, 24c, 24d, 24e, 24f (collectively designated computers 24) by corresponding network pathways 26a, 26b, 26c, 26d, 26e, 26f (collectively designated pathways 26). Network 22 may be in the form of a Local Area Network (LAN), Wide Area Network (WAN), such as the Internet, or other network type as would occur to those skilled in the art. Computers 24 may all be of the same type, or a heterogeneous combination of different computing devices coupled to network 22.

Each of computers 24 is further designated as including a client or server. For computers 24a, 24b, 24c; servers 30a, 30b, 30c are respectively designated. For computers 24d, 24e, 24f; clients 60a, 60b, 60c are respectively designated. While computers 24 are each illustrated as being a server or client, it should be understood that any of computers 24 may be arranged to include both a client and server.

In the case of servers 30a, 30b, 30c (collectively designated servers 30), each has a broker/reporter entity 32a, 32b, 32c (collectively designated brokers 32), respectively. In the case of clients 60a, 60b, 60c (collectively designated clients 60), each has a corresponding selector agent 62a, 62b, 62c (collectively designated agents 62), respectively.

Each computer 24 includes a corresponding programmable processor or Central Processing Unit (CPU) 27a, 27b, 27c, 27d, 27e, 27f (collectively designated processors 27) and computer-readable memory 29a, 29b, 29c, 29d, 29e, 29f (collectively designated memories 29), respectively. It should be understood that each computer 24 may include more than one processor or CPU and more than one type of memory, each of memories 29 being representative of one or more types associated with the corresponding computer 24. Furthermore, it should be understood that while six computers 24 are illustrated, more or fewer may be utilized in alternative embodiments.

Processors 27 may each be comprised of one or more components configured as a single unit. Alternatively, when of a multi-component form, processors 27 may each have one or more components located remotely relative to the others. One or more components of each processor 27 may be of the electronic variety defining digital circuitry, analog circuitry, or both. In one embodiment, processors 27 each have a conventional microprocessor architecture provided in the form of one or more integrated circuit chips. Each processor 27 may include any oscillators, control clocks, interfaces, signal conditioners, filters, limiters, converters, communication ports, and other types of operators as would occur to those skilled in the art to implement the present invention.

Memories 29 may each include one or more types of solid-state electronic memory, magnetic memory, or optical memory, just to name a few. By way of nonlimiting example, each memory 29 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 29 may be volatile, nonvolatile or a hybrid combination of volatile and nonvolatile varieties.

System 20 further illustrates Public Switched Telephone Network (PSTN) 52 coupled to computer-controlled telephone switch 54 of computer 24a by pathway 53. Switch 54 is also coupled to telephones 58a, 58b, 58c (collectively designated telephones 58) by pathways 56a, 56b, 56c (collectively designated pathways 56), respectively. Telephones 58 may be in the form of a handset, headset, or other arrangement as would occur to those skilled in the art. Telephones 58a, 58b, 58c are each associated with one of computers 24d, 24e, 24f, respectively, to provide stations 59a, 59b, 59c (collectively designated stations 59). Switch 54 may be arranged in the form of a Private Branch Exchange (PBX), predictive dialer, Automatic Call Distributor (ACD), a combination of these, or another switching configuration as would occur to those skilled in the art.

In one embodiment, system 20 operates as a call center with computer 24a being configured as a call center server host and computers 24d, 24e, 24f each arranged as a call center client host. Accordingly, system 20 is designated as including call center 21. For such an arrangement, additional telephones 58 may be connected to switch 54 that each correspond to an additional client host to provide more stations 59 (not shown). Typically call center applications of system 20 would include many more stations of this type, but only a few have been illustrated in FIG. 1 to preserve clarity. Also, more than one computer 24 may be configured as a call center server host.

Alternatively or additionally, system 20 may be arranged to provide for the coordination, conversion, and distribution of a number of different forms of communication, such as telephone calls, voice mail, faxes, e-mail, web chats, web call backs, and the like. Furthermore, business/customer data associated with various communications may be selectively accessed with system 20. This data may be presented to an operator (call center agent) at each station 59 by way of a station display monitor operably coupled to the corresponding computer 24. In addition to a display monitor, each computer 24 of station 59 may be operably coupled to one or more operator input devices such as a keyboard or mouse, just to name a few.

It should be recognized that network 22 may include one or more elements of PSTN 52. Indeed, in an alternative embodiment, network 22 and PSTN 52 are provided as a common network. Still other alternative embodiments of the present invention are not directed to telephone or communication operations. Correspondingly, such alternatives need not include PSTN 52, switch 54, or telephones 58.

System 20 is arranged to distribute software tasks from clients 60 among servers 30 via network 22. Such tasks include, but are not limited to instances of an object class, dedicated code segments, device interface operations, or any other forms of software algorithms, routines, or modules as would occur to those skilled in the art. Processing load balancing is performed through communications between agents 62 and brokers 32. Generally, when one of clients 60 has a task that can be distributed among servers 30, its corresponding agent 62 communicates over network 22 with the brokers 32 to select a particular server 30 to perform the task. During this communication, agent 62 for the requesting client 60 interrogates each broker 32 to receive a bid corresponding to its server's ability to promptly perform the task to be distributed. The interrogating agent 62 accumulates the bids from the interrogated brokers 32 and compares the bids to select a server 30. Connection/distribution information is provided by the broker 32 of the selected server 30 to establish remote performance of the task.

Figure 2:
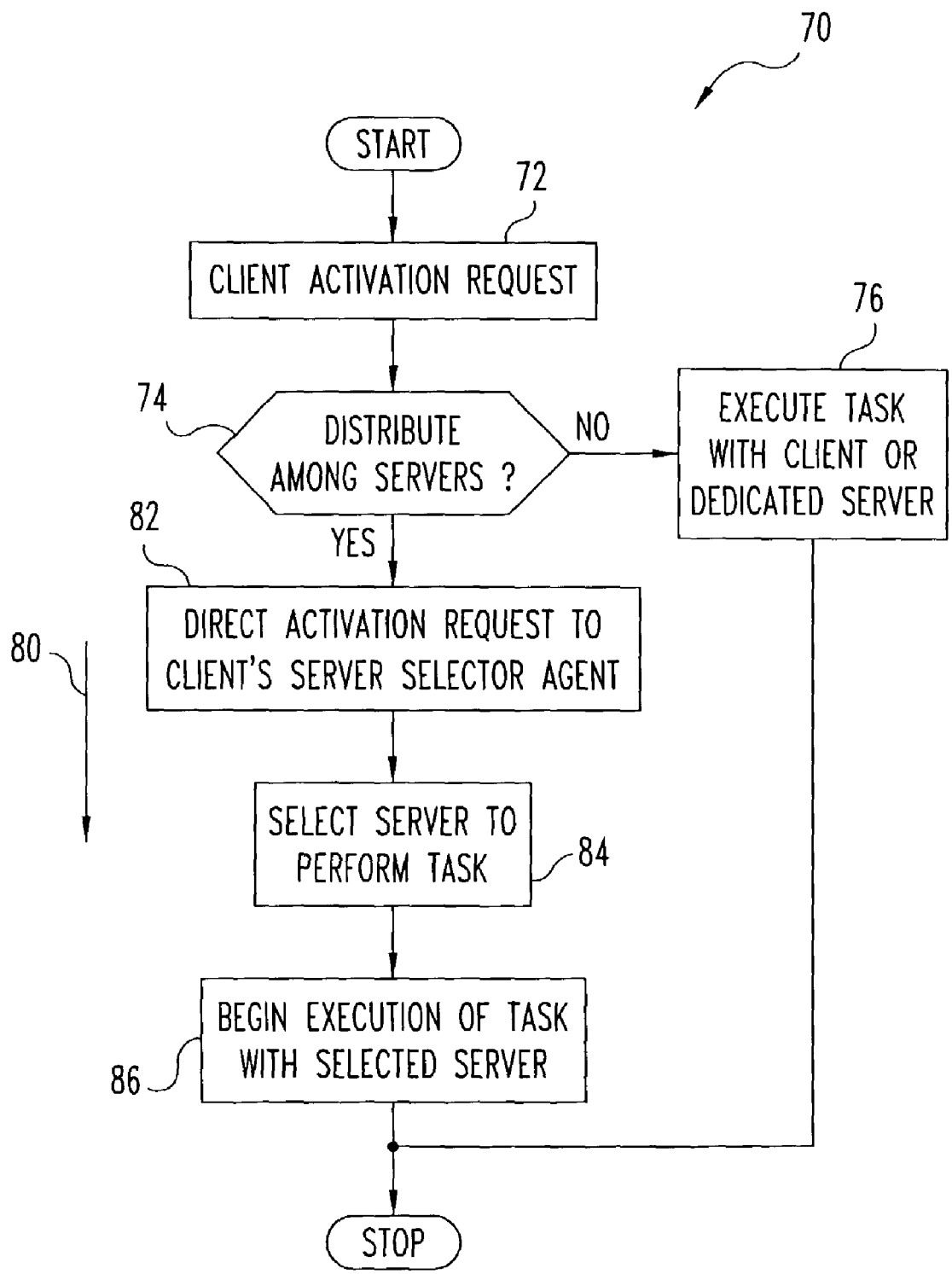
FIG. 2 illustrates a flow chart of a distribution procedure performed by the system of FIG. 1.

Referring additionally to FIG. 2, one embodiment for implementation with system 20 is illustrated in flow chart form as software task distribution procedure 70. As shown, procedure 70 illustrates management of only one software task requested by one of clients 60 for clarity; however, it should be understood that procedure 70 may be executed multiple times by one or more of clients 60. Procedure 70 begins with an activation request for a software task by one of clients 60 in stage 72. Procedure 70 then proceeds to conditional 74 to determine whether the activation request is for a software task of the type to be distributed to one of servers 30. If the software task is not to be distributed (corresponding to a negative outcome of the test of conditional 74), then procedure 70 continues with stage 76 to execute the task locally or with a designated remote server. Procedure 70 halts after execution of stage 76. If the test of conditional 74 is positive, then distribution branch 80 of procedure 70 is engaged, as indicated by the downwardly pointing arrow in FIG. 2. Branch 80 begins with stage 82. In stage 82, the activation request is directed to the agent 62 corresponding to the requesting client 60.

In one nonlimiting example, conditional 74 is not implemented as a dedicated software or hardware test, but rather is executed for a given task based on the nature of a corresponding entry in a system registry. For this example, the registry entry for a task that is to be distributed references an intermediate agent, such as agent 62, which performs distribution and/or load balancing as more fully described hereinafter. In contrast, tasks of a conventional type may be registered in the usual manner, without an intervening agent.

In a further nonlimiting example, another more specific implementation of stages 72, 76, 82 and conditional 74 of procedure 70 is described with respect to an arrangement in which computers 24 each include the MICROSOF™ WINDOWS NT 4.0 operating system to perform client and server operations. This arrangement is particularly suited for operation of a call center with system 20 as previously described. The Distributed Component Object Model (DCOM) feature of the NT 4.0 operating system provides a mechanism to distribute class object activation requests from one of clients 60 to one of servers 30. Common functions used for distributed requests are the functions CoCreateInstance and CoCreateInstanceEx which are wrappers for calling the CoGetClassObject and IClassFactory::CreateInstance functions. The CoGetClassObject function serves as a starting point for activation of a software task, which for this embodiment may be in the form of an instance of a desired class object. The CoGetClassObject function takes a set of class context flags (CLSCTX) and server information structure (COSERVERINFO) as parameters. Unfortunately, the NT 4.0 operating system does not include a mechanism to regulate processing load between multiple servers. As a result, these functions are typically set up to operate according to a default behavior without load balancing among available servers.

Generally, when the DCOM mechanism on the client side (hereinafter designated a DCOM client) wishes to initiate an instance of an object, it first checks an internal table to see if there is a running instance of the class object already available and returns a pointer to (a proxy for) that class object if one is found. If there is not a running instance of the class object, the DCOM client looks in the NT 4.0 operating system registry to determine how to locate or start an appropriate server. If the class is under the registry index or "key" InprocServer 32 of NT 4.0, the Dynamic Link Library (DLL) named by this key's value is loaded with the LoadLibrary function, the address of the _DllGetClassObject entry point is queried with the GetProcAddress function, and that entry point is invoked to get the necessary pointer. In contrast, if the class is registered with the LocalServer32 key, the executable program (EXE) named by that key's value is started with the CreateProcess function, and the DCOM mechanism waits up to 30 seconds for the new process to register its class objects. Once the requested class object is registered, the DCOM mechanism returns the pointer to that object. Additional registry settings can be used to cause the server to be activated on a different host, in which case the DCOM client contacts the DCOM mechanism operating on the remote host which takes over the responsibility of finding or starting an appropriate DCOM server.

It has been found that this existing DCOM mechanism may be utilized to provide for load balancing of existing applications and components running under the NT 4.0 operating system. For this procedure, when a client activation request for an object instance corresponding to stage 72 of procedure 70 occurs, a DLL is inserted under the InprocServer32 key for a corresponding DCOM class to be distributed across multiple servers 30. For this embodiment, the inserted DLL intercepts and re-directs activation requests from any client 60 making a CoGetClassObject call that includes CLSCTX_INPROC_SERVER. Moreover, for a DLL that can run in a surrogate process under the NT 4.0 operating system, it can also be arranged to intercept and redirect activation requests from any client specifying an object to be executed by an out-of-process server.

Accordingly, for this embodiment, the client activation request stage 72 and conditional 74 test may be accomplished through this interception and re-direction procedure using the DCOM tools of the NT 4.0 operating system. Further, the inserted DLL may be used to direct the activation request to the agent 62 of the requesting client 60 as illustrated in stage 82; where agent 62 may be in the form of an NT compatible software object class. Naturally, in another embodiment of the present invention in which computers 24 do not include the NT 4.0 operating system, stages 72, 76, 86 and/or conditional 74 are implemented differently. Indeed, in other embodiments, different techniques may additionally or alternatively be utilized to implement stage 72, conditional 74, stage 76, and/or stage 82, regardless of the type of operating system or systems used.

Figure 3A:
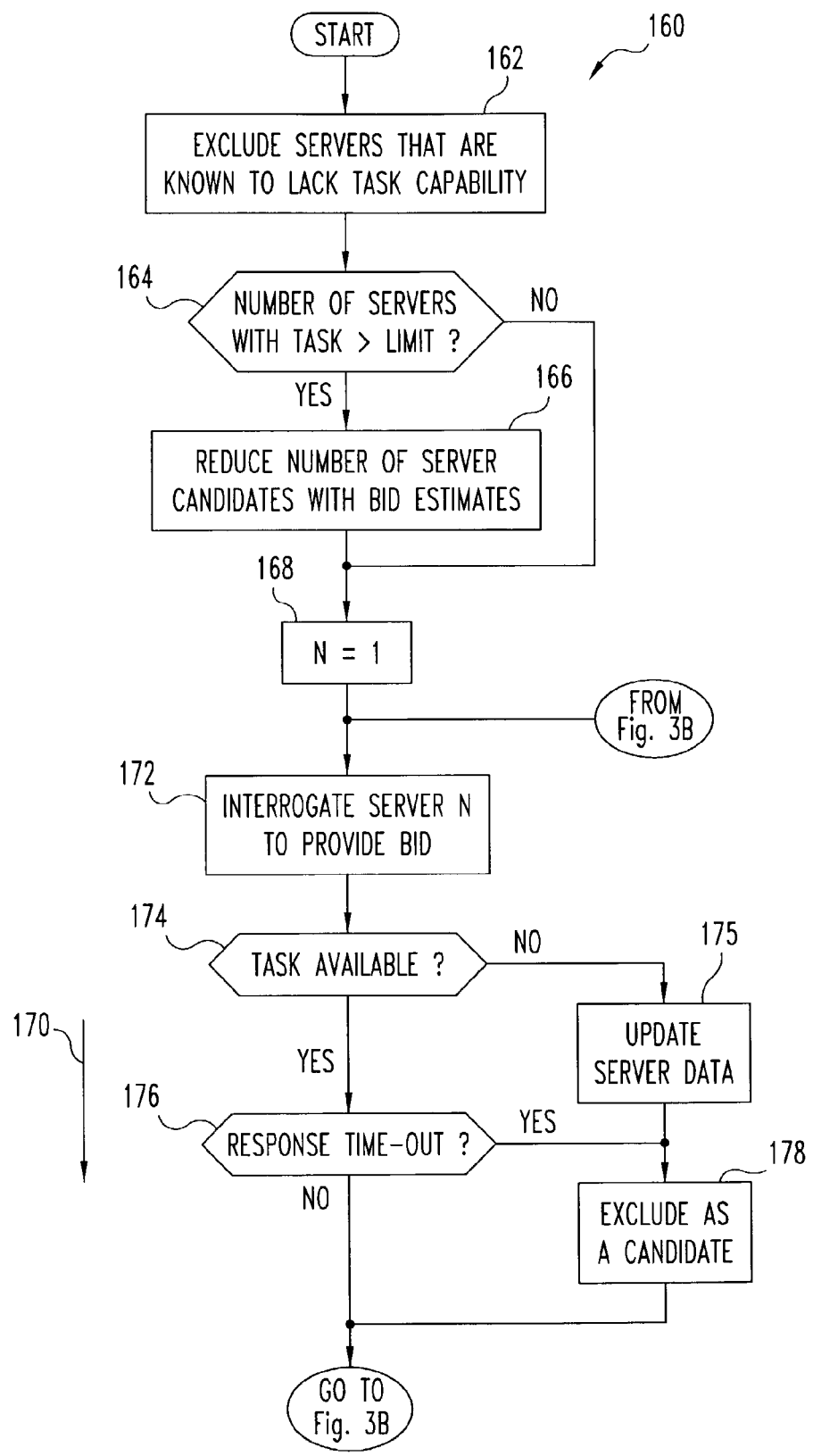
FIGS. 3A and 3B illustrate a flow chart for a client-side distribution/load balancing routine executed as part of the server selection operation of FIG. 2.
Figure 3B:
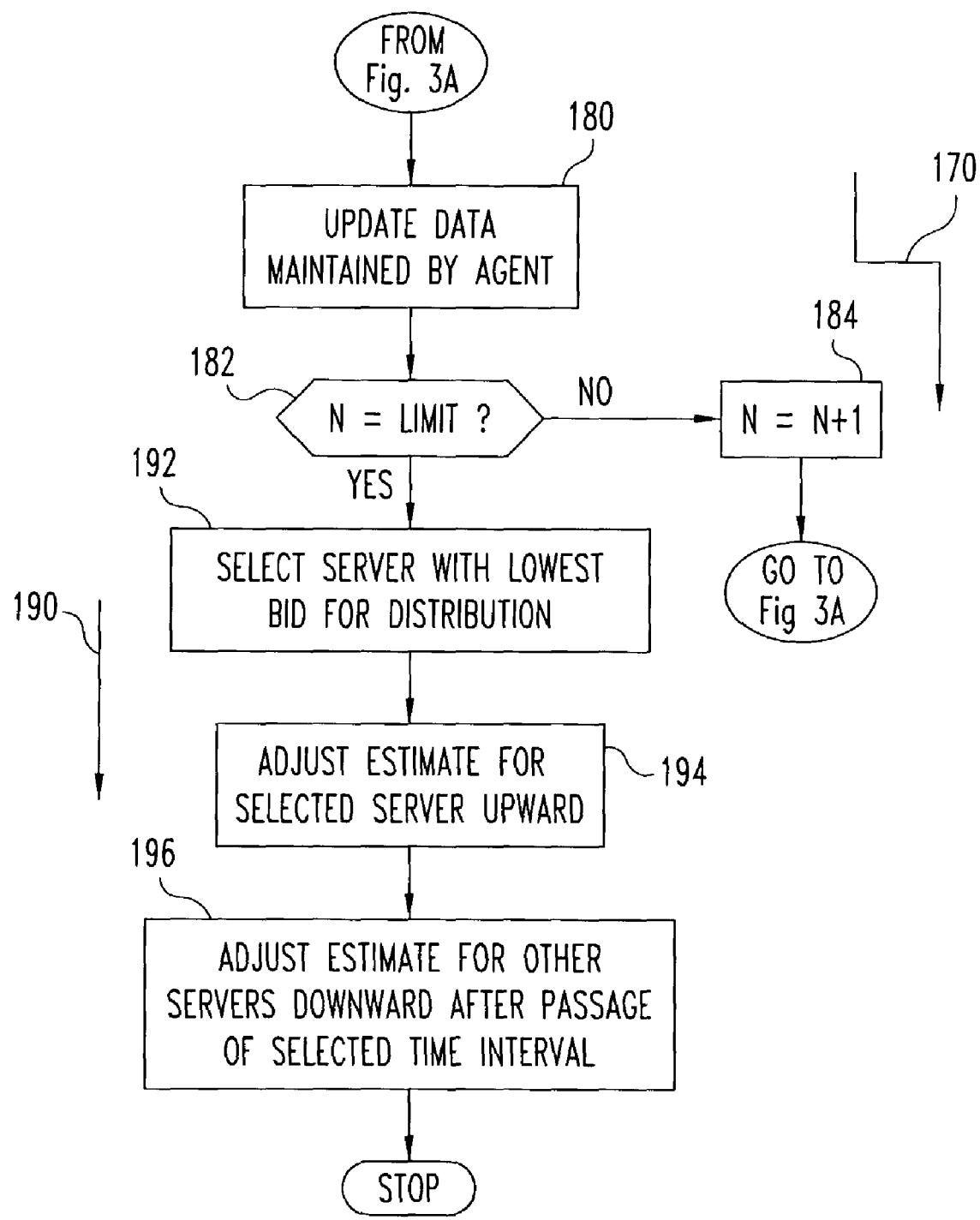

Once stage 82 is performed, stage 84 is encountered to designate one of servers 30 to perform the task. This designation takes place by performing a server selection operation with the agent 62 for the requesting client 60 and brokers 32. FIGS. 3A and 3B illustrate a client-side distribution/load balancing routine 160 executed by the agent 62 as part of this operation. Routine 160 starts with stage 162. In stage 162, the agent 62 for the requesting client 60 excludes any of servers 30 that are known to lack the particular software task desired to be distributed. This capability and other data about servers 30 is maintained by each agent 62 and is updated at various stages as further described hereinafter. Typically, each agent 62 maintains server information in memory 29 of the computer 24 on which is resides.

Conditional 164 is next encountered which tests whether the number of servers known to have the capability to perform the task exceed a maximum limit designated by "LIMIT". If this limit is exceeded, then stage 166 is encountered to perform a reduction of the number of server candidates. This reduction is performed by accessing established server data maintained by the agent 62 of the requesting client 60. This data includes estimated bids expected from the various servers 30 that were not excluded as lacking the capability to perform the requested task in stage 162. In stage 166, the estimates of the eligible servers 30 are compared and sorted to identify a subset of servers 30 having the lowest estimated bids and a total membership of LIMIT. This subset is provided as the candidate servers in subsequent stages of routine 160. The bid estimates are determined as a function of bid information from prior executions of routine 160, timing, and other factors as explained in more detail in connection with stages 194 and 196 of routine 160 (see FIG. 3B).

The test of conditional 164 and reduction of stage 166 is directed to maintaining the number of servers 30 involved in routine 160 below a manageable level. Typically, the maximum number of candidate servers 30, corresponding to the value of LIMIT, is selected so that the burden presented to system 20 by these servers does not overtake efficiency gains realized by performing task distribution. The value selected for LIMIT may be based on one or more factors, including but not limited to: the total number of servers, any network performance differences of the servers, the type and complexity of the tasks to be distributed, and the degree of loading of the servers 30 and network 22. The value of LIMIT may be static or dynamically adjusted in accordance with one or more parameters, may be uniformly or individually assigned with respect to each client 60 and/or task, or otherwise assigned as would occur to those skilled in the art. It should be appreciated that for a first time distribution of a given software task or a first time activation of a given agent 62, stages 162 and 166 may not result in any exclusion or reduction, respectively, of candidate servers. Alternatively, a randomized reduction may be performed in stage 166 when anticipated or estimated bids have not yet been determined. After performing stage 166, routine 160 proceeds to stage 168. Likewise, if the test of conditional 164 is negative, routine 160 bypasses stage 166 to proceed directly to stage 168. Stage 168 sets index counter N to 1 (N=1).

Next, server interrogation loop 170 is entered starting with stage 172. In stage 172, the server 30 corresponding to index N (alternatively designated "server N") is interrogated by the agent 62 of the requesting client 60 to solicit a bid corresponding to server N's ability and/or availability to perform the task. The response from server N is communicated by its corresponding broker 32 to the interrogating agent 62 via network 22. For the NT 4.0 operating system embodiment previously described, broker 36 may be an instance of an object class established through the DCOM protocol for distributing tasks to remote server hosts. As reflected in conditional 174, if the response of the broker 32 indicated that the task is not available for the particular server N, then the data maintained by the interrogating agent 62 is updated in stage 175 to indicate server N lacks the requisite task capability, and routine 160 proceeds to stage 178 to exclude server N as a candidate. Accordingly, future interrogations by the agent 62 of the requesting client 60 to distribute the pending type of task will exclude the current server N during performance of stage 162.

If the test of conditional 174 is affirmative, routine 160 continues with conditional 176. Conditional 176 times how long it takes the interrogated broker 36 to respond. If a response is not received within a predefined time interval, then server N is excluded as a candidate in stage 178. This exclusion corresponds to a server and/or broker 32 that is too busy to respond to an interrogating agent 62 within a reasonable amount of time. This time limit may be selected based on one or more of the factors described in connection with the selection of LIMIT. Likewise, the time limit may be statically or dynamically assigned; may be specific to the client, server, or task type; or may be the same for all clients 60, servers 30, and/or task types. Typically, the failure of a given broker 32 to respond within the time limit does not exclude that server from future agent interrogations unlike the case when it is determined a task is unavailable via conditional 174.

After performance of stage 178, loop 170 continues with stage 180 illustrated in FIG. 3B. Likewise, stage 180 is reached if the test of conditional 176 is negative. In stage 180, data maintained by the interrogating agent 62 is updated for the particular server N undergoing interrogation in loop 170. Next, conditional 182 is encountered to determine if the index counter N equals the value previously described in connection with conditional 164. If N does not equal LIMIT (N≠LIMIT), routine 160 continues at stage 184 to increment index counter N (N=N+1). From stage 184 routine 160 returns to stage 172 of loop 170 as illustrated in FIG. 3A. Correspondingly, loop 170 is again performed with a different one of the candidate servers 30 designated as server N. In this manner, loop 172 is repeated, interrogating a different broker 32 with each repetition, until a total number of servers 30 interrogated equals LIMIT.

Once N reaches LIMIT (N=LIMIT), conditional 182 is satisfied and loop 170 is exited, as shown in FIG. 3B. Routine 160 then proceeds to termination branch 190. In stage 192 of branch 190, agent 62 of the requesting client 60 selects the candidate server 30 with the lowest bid, as provided by that server's broker 32 in stage 172. The broker 32 of the selected server 30 sends distribution/connection information to the requesting client 60 to facilitate distributed execution of the subject task. In the case of the previously described NT 4.0 embodiment, distribution may be established by returning an interface (proxy) pointer back to the interrogating agent 62 of the requesting client 60. Branch 190 proceeds from stage 192 to stage 194 to adjust the bid estimate for the selected server 30 upward in correspondence with its increased processing load as a result of being designated for task execution. In stage 196, estimates for other servers 30 may be adjusted downward if a predefined time interval has passed since the last interrogation for bids from such servers 30. Other factors may alternatively or additionally be utilized to adjust bid estimates as would occur to those skilled in the art. Also, it should be appreciated that adjustments of bid estimates can be performed more than once during routine 160 or in a different sequence as would occur to those skilled in the art. In one alternative embodiment, bid estimate adjustments of one or more servers 30 are made as part of stage 166 in addition or as an alternative to stage 196. After stage 196, routine 160 halts.

Figure 4:
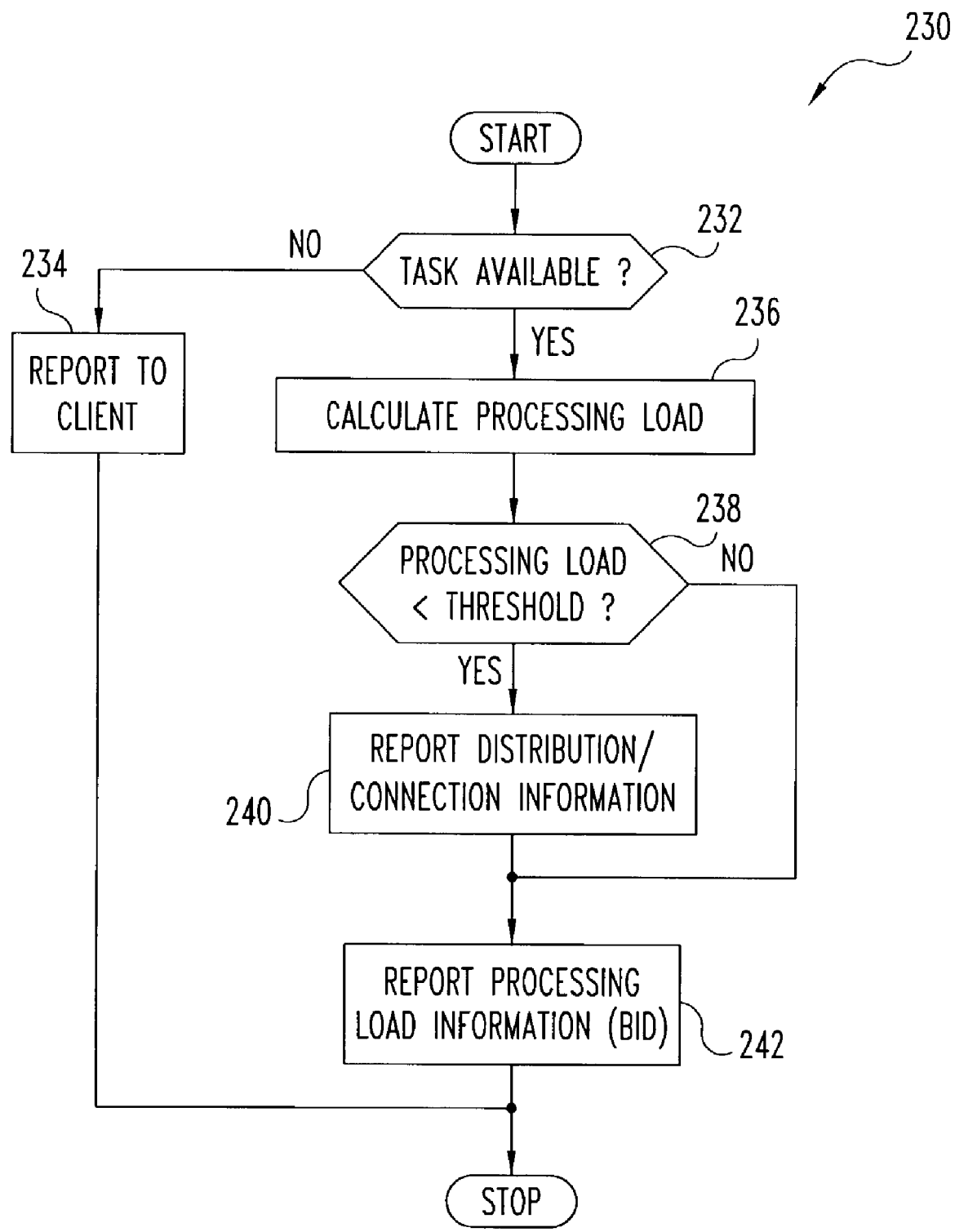
FIG. 4 illustrates a flow chart of a server-side distribution/ load balancing routine executed as part of the selection operation of FIG. 2.

Referring additionally to FIG. 4, server-side distribution/load balancing routine 230 is illustrated. Routine 230 is performed as part of the server selection operation of stage 84 shown in FIG. 2. It should be appreciated that routine 230 operates as part of each broker 32 and selectively communicates with interrogating agents 62 executing routine 160. Routine 230 begins with conditional 232. Conditional 232 tests whether the desired task is available in response to an interrogation by an agent 62 in stage 172 of routine 160. If the task is not available, the broker 32 reports to the interrogating agent 62 in stage 234 of routine 230. In response, conditional 174 of routine 160 is negative, leading to stage 175. If the task is available as tested by conditional 232, routine 230 proceeds to stage 236 to calculate processing load for the corresponding server 30. The processing load calculation may include a number of factors such as the available percentage of idle time for the corresponding processor 29, an average load level indication for the processor 29, and/or a relative processing index or capability of the given computer 24. Also, specifics relative to the performance of the desired task may be utilized in this determination. For example, some tasks may require the use of certain unique hardware resources that will result in a disproportionate degree of loading compared to other computers and/or server arrangements. Indeed, there are numerous factors that may be considered in calculating processing load.

Once processing load is determined in stage 236, control flows to conditional 238 to compare the processing load information to a threshold value illustrated as variable "THRESHOLD". The value of THRESHOLD corresponds to a lightly loaded or minimally loaded processor 29 for which there is a high probability that the bid of the responding broker 32 will be the lowest. Accordingly, when conditional 238 is satisfied, routine 230 proceeds to stage 240 to initiate the task and report corresponding distribution/connection information necessary to utilize the task at the same time that the bid corresponding to processing load information is provided in subsequent stage 242. For the NT 4.0 operating system embodiment, the distribution connection information may be an interface pointer (proxy) for an instance of the requested class object running on the responding server 30. As a result, if the given server is selected, then fewer communication exchanges will be necessary between the interrogating agent 62 and broker 32 to establish task distribution; thereby reducing the overhead imposed by the distribution procedure 70. If the server 30 for the broker 32 responding according to stage 240 of routine 230 is not selected in stage 192 of routine 160, the distribution/connection information is disregarded or ignored by the interrogating agent 62.

If conditional 238 is not satisfied, then routine 230 proceeds directly to stage 242 to report processing load information in the form of a bid by the interrogated broker 32. It should be appreciated that when a task in unavailable it may be reported in the form of an infinite or excessively high bid recognized by the interrogating agent 62 as being an unavailable task. Once stage 242 is performed, process 230 halts.

While procedure 70 and routines 160, 230 utilize a "lowest bid" protocol to select a server 30 to perform a given task, in other embodiments other protocols may alternatively or additionally be utilized. For example, the processing load information may be directly reported by brokers 32 and/or one or more parameters corresponding to processing load may be reported to interrogating agents 62 by brokers 32. In one alternative, agents 62 include the capability to vary the type of processing load information and/or processing load parameters requested. In another embodiment, the type of processing load information reported may be server, client, and/or task type specific. In still other embodiments, the interrogating agent 62 collects raw data about the performance of each interrogated server 30 through a corresponding broker 32 and partially or completely calculates processing load. Indeed, many techniques to exchange and determine server processing load information as would occur to those skilled in the art are contemplated.

Returning to FIG. 2, once the server selection operation of stage 84 has been performed by executing routine 160 with the agent 62 of the requesting client 60, and routine 230 with each broker 32 for the candidate servers 30; procedure 70 continues with stage 86. In stage 86, execution of the distributed task with the designated server 30 begins. Stage 86 may include establishing and exchanging task connection information between the requesting client 60 and selected server 30 via network 22. Alternatively, it should be appreciated that some or all of this information may have already been provided to the requesting client 60. Once execution is started, procedure 70 then halts.

Figure 5:
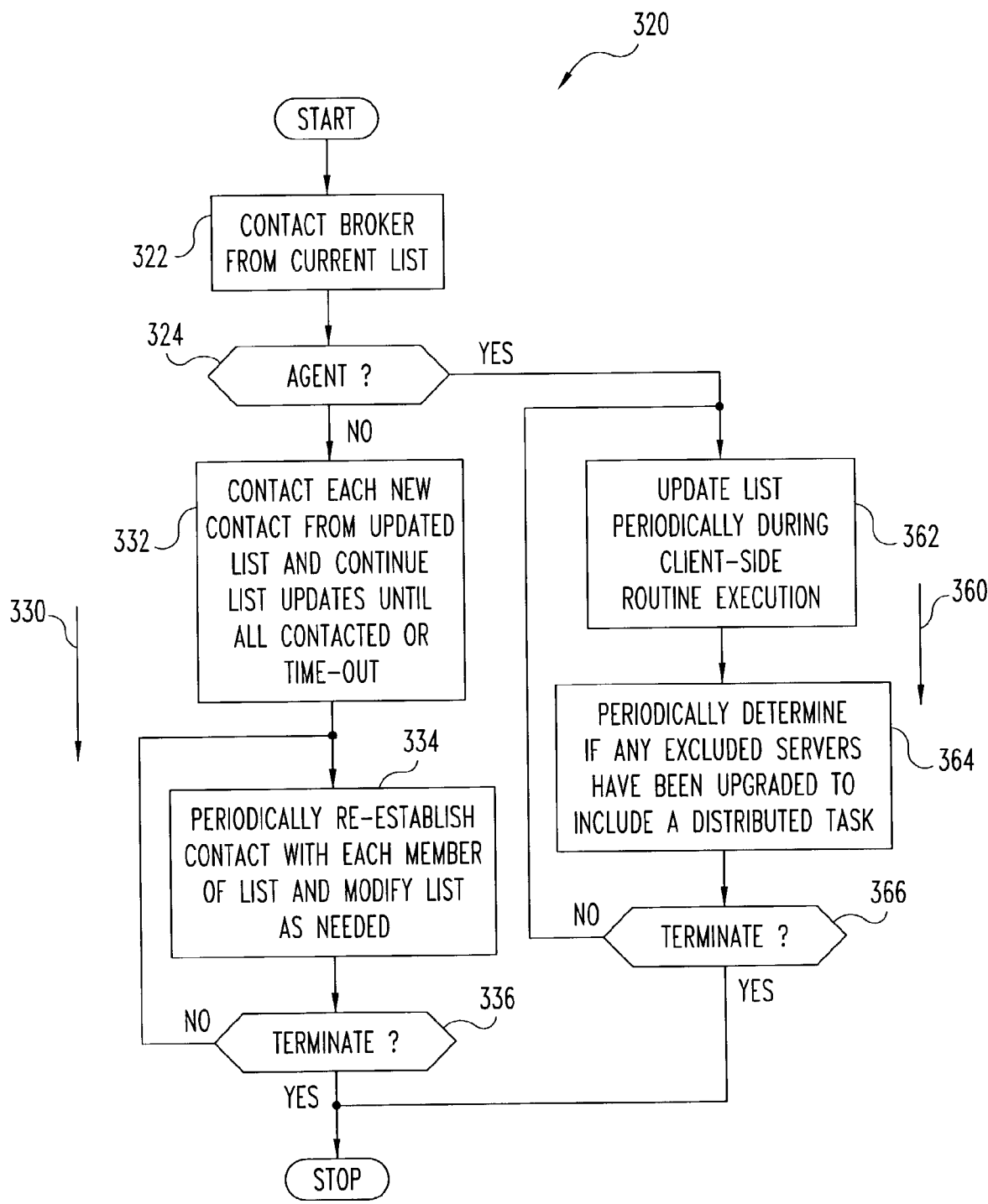
FIG. 5 illustrates a flow chart of a start-up and maintenance routine to support the procedure of FIG. 2.

Referring next to FIG. 5, start-up and maintenance routine 320 for system 20 is illustrated. Routine 320 is directed to the establishment and maintenance of information necessary for brokers 32 to communicate with each other and for active agents 62 to identify active brokers 32. Stage 322 corresponds to an initial start-up or activation of one of brokers 32, one of agents 62, or both. Each broker 32 and agent 62 maintains a prioritized broker list in the memory 29 of one of computers 24 corresponding to the broker 32 or agent 62 being activated. In stage 322, the starting broker 32 or agent 62 interrogates the first entry on the list across network 22. If contact cannot be established with the first entry, subsequent entries are contacted until one is found. Once communication with a listed entry is established, the broker list is updated with list entries of the contacted broker 32 that are indicated to be active. This active broker list is then saved by the contacting broker 32 or agent 62. Routine 320 then proceeds to conditional 324.

In conditional 324, if the contacting entity is an agent 62, routine 320 proceeds to branch 360. On the other hand, if the contacting entity is not an agent 62, it defaults to a broker 32 designation according to conditional 324 and routine 320 proceeds to branch 330. Branch 330 starts with stage 332. In stage 332, starting broker 32 continues to contact each new active broker 32 entered in its updated list, and the active entries of each contacted broker 32 are added to the active broker list of the contacting broker 32, until all its entries have been contacted. If an entry fails to respond within a specified time-out period during stage 332, such non-responding brokers 32 are regarded as inactive. With the conclusion of stage 332, all active brokers 32 are listed with the starting broker 32, and the start-up phase is complete. After the start-up phase, each broker 32 enters a maintenance loop starting with stage 334. In stage 334, the active broker 32 re-establishes contact with each member of its active broker list from time to time, and modifies the list as needed. After stage 334, conditional 336 is encountered to determine whether the active broker 32 is to be terminated. If not, control returns to stage 334, closing the maintenance loop to once again establish contact with each member of the active broker list. The time interval between contacts is selected such that its impact is negligible on the performance of system 20, and may be uniform or variable. If the subject broker 32 has been terminated as tested in conditional 336, then routine 320 halts.

Returning to branch 360, in the case of an active agent 62, its broker list is periodically updated as it executes routine 160 in stage 362. This update may not occur with every execution, but may be timed in a manner to provide negligible impact to overall performance of system 20. In stage 364 of segment 360, there is an interrogation from time to time of servers 30 that were previously indicated to lack a given task. This interrogation is performed to determine if that task has since been loaded on the given server. The time interval between actions in stages 362 and 364 should be relatively infrequent to provide negligible impact on the performance of system 20, and may be uniform or variable. After stage 364, conditional 366 tests whether the active agent 62 is to terminate. If not, routine 320 loops back to stage 362 and subsequently stage 364 until the given agent 62 is terminated. The return loops provided from conditionals 336, 366 each function as background routines for active brokers 32 and agents 62, respectively. Although only described in terms of a particular broker 32 and agent 62, it should be understood that routine 320 is performed for each active broker 32 and agent 62. Routine 320 is invoked upon start-up or activation of a corresponding broker 32 or agent 62 and continues to maintain the broker list of each entity as well as other data in the case of agents 62.

For the NT 4.0 operating system embodiments earlier described, the agents 62 and brokers 32 can be provided on each participating computer 24 in the form of a distributor module with two logical classes, a first class corresponding to agents 62 and a second class corresponding to brokers 32. Indeed, either of these classes may involve one or more different objects. Furthermore, the distributor module may be provided as an NT service to facilitate the start-up aspects of routine 320. Naturally, in other embodiments, a different implementation may be utilized regardless of operating system type. Indeed, in one alternative embodiment, at least a portion of the agent 62 and/or the broker 32 is provided in the form of hardware.

It should be recognized that the allocation of the process distribution/load balancing function among all servers 30 and clients 60, provides a robust mechanism to continue distribution, even if several servers 30 and corresponding brokers 32 unexpectedly go off-line. Such off-line brokers 32 can be detected by agents 62 or other entities based on the failure of the off-line broker 32 to send a response when expected. Off-line brokers 32 may be reported to other agents 62 and brokers 32 once detected, or each agent 62 may be left to make the determination independently. When one or more brokers 32 go off-line, the remaining brokers 32 can continue to participate in routines 160, 230 even if they are left as two or more disjoint groups by the disorderly loss of the off-line brokers 32. Indeed, the re-establishment of contact with other brokers in stage 334 of routine 320 from time to time eventually rejoins active broker groups that have become separated. As a result, recovery from a catastrophic loss of several brokers 32 all at once is possible.

In another embodiment of the present invention, the system is arranged to distribute software tasks from clients among servers via a packet-switched network such as the Internet, using one or more web services. Web services are software services that are exposed to other software over standard Internet protocols. Web services can be activated from multiple platforms, both over an Intranet and the Internet. Web services typically use HTTP as their transport, although other protocols such as SMTP and TCP/IP can be used. Clients can communicate with web services through formats such as Extensible Markup Language (XML) or binary web standard formats, to name a few.

Figure 6:
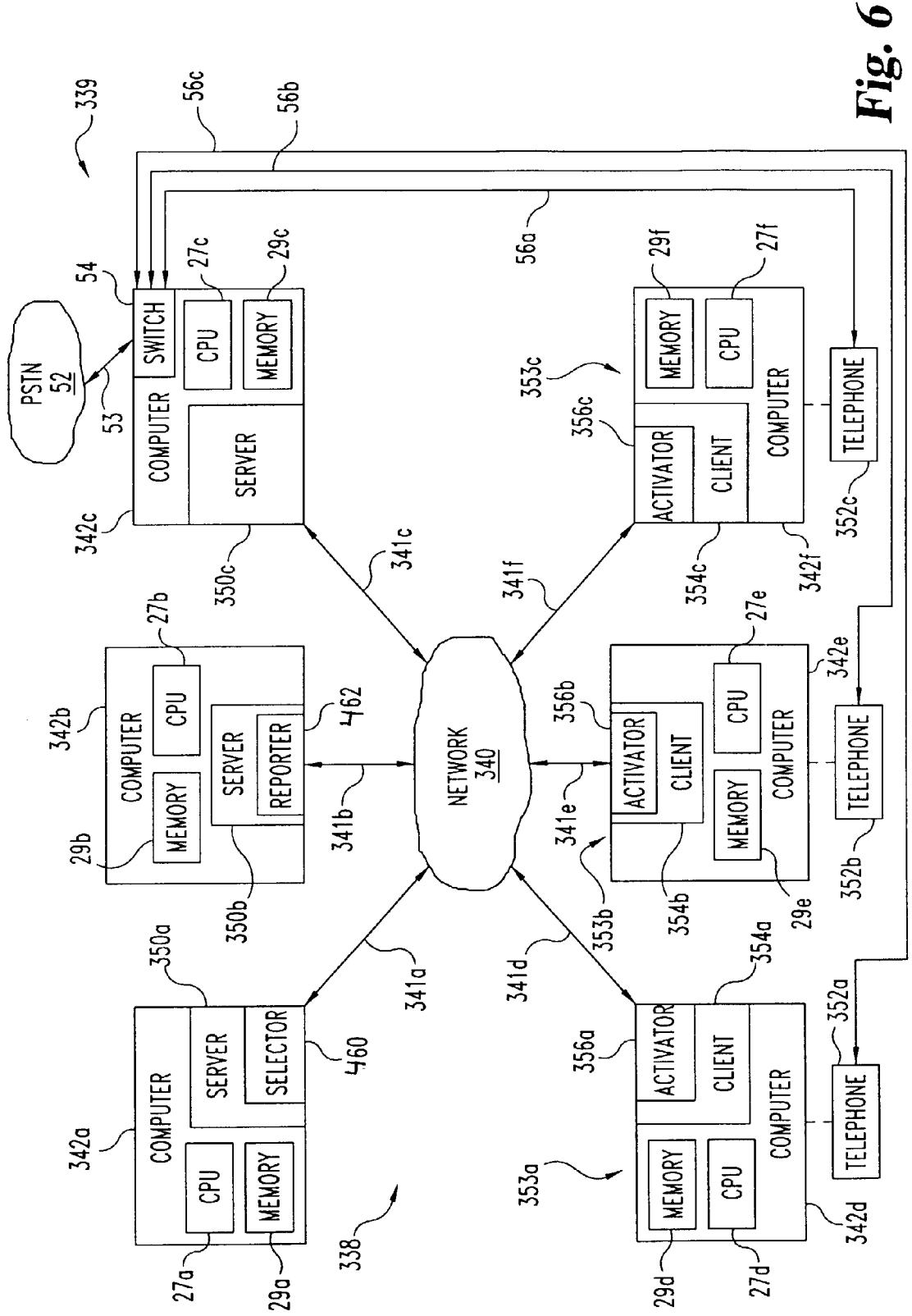
FIG. 6 is a schematic view of a computer system according to another embodiment of the present invention.

FIG. 6 schematically illustrates computer system 338 of such an embodiment of the present invention, where like reference numerals of previously described embodiments refer to like features. System 338 includes computer network 340 coupling together a number of computers 342a, 342b, 342c, 342d, 342e, 342f (collectively designated computers 342) by corresponding network pathways 341a, 341b, 341c, 341d, 341e, 341f (collectively designated pathways 341). Network 340 may be in the form of a Local Area Network (LAN) or Wide Area Network (WAN), such as an Intranet or the Internet, a combination of these, and/or a different network type as would occur to those skilled in the art. Computers 342 may all be of the same type, or a heterogeneous combination of different computing devices coupled to network 340.

Each of computers 342 is further designated as including a client or server. For computers 342a, 342b, 342c; servers 350a, 350b, 350c are respectively designated. For computers 342d, 342e, 342f; clients 354a, 354b, 354c are respectively designated. While computers 342 are each illustrated as being a server or client, it should be understood that any of computers 342 may be arranged to include both a client and server.

Server 350a has a selector web service 460 and server 350b has a broker/reporter entity 462. In the case of clients 354a, 354b, 354c (collectively designated clients 354), each has a corresponding web service activator 356a, 356b, 356c (collectively designated activators 356), respectively, for activating the selector web service 460.

Each computer 342 includes a corresponding programmable processor or Central Processing Unit (CPU) 27a, 27b, 27c, 27d, 27e, 27f (collectively designated processors 27) and computer-readable memory 29a, 29b, 29c, 29d, 29e, 29f (collectively designated memories 29), respectively, as previously described.

System 338 further illustrates Public Switched Telephone Network (PSTN) 52 coupled to computer-controlled telephone switch 54 of computer 342c by pathway 53. Switch 54 is also coupled to telephones 352a, 352b, 352c (collectively designated telephones 352) by pathways 56a, 56b, 56c (collectively designated pathways 56), respectively. Telephones 352 may be in the form described in a prior embodiment. Telephones 352a, 352b, 352c are each associated with one of computers 342d, 342e, 342f, respectively, to provide stations 353a, 353b, 353c (collectively designated stations 353). Switch 54 may be arranged in manner described in a prior embodiment.

In this embodiment, the client activators 356 send activation requests to the selector web service 460 on server 350a, instead of to an agent on the client. The selector web service 460 receives the client activation request and then and interrogates each broker/reporter 462 to receive a bid corresponding to its server's ability to promptly perform the task to be distributed. The selector web service 460 accumulates the bids from the interrogated brokers and compares the bids to select a server. Connection/distribution information is provided by the broker/reporter 462 of the selected server 350b to establish remote performance of the task. Additionally or alternatively, the broker/reporter could be implemented as a web service. In such case, there could be a broker/reporter web service on each server or alternatively on one or more servers. The broker/reporter web service could be on the same server or on a different server than the selector web service. Each broker/reporter web service is responsible for providing connection/distribution information for any server it is responsible for monitoring.

The operation of system 338 can be the same as described in connection with procedure 70 of FIG. 2, with a few differences which are described as follows. Specifically, the client activation request originates from a client activator 356 for clients 354. If the client activator 356 determines the task is to be distributed, then the activation request is directed to the web service selector 460.

In one embodiment, system 338 operates as a call center with computer 342c being configured as a call center server host and computers 342d, 342e, 342f each arranged as a call center client host. Accordingly, system 338 is designated as including call center 339. For such an arrangement, additional telephones 352 may be connected to switch 54 that each correspond to an additional client host to provide more stations 59 (not shown). Typically call center applications of system 338 would include many more stations of this type, but only a few have been illustrated in FIG. 6 to preserve clarity. Also, more than one computer 342 may be configured as a call center server host.

Many alternative embodiments are envisioned for the present invention. In one example, a technique to migrate remote server execution of a distributed task is included. In other alternatives, the general availability of all tasks with all servers excludes the need to test whether a given task is available and routines 160, 230, and 320 may be modified accordingly. In still other alternatives, the particular sequence and timing of various background loops and checks may be adjusted depending on processing load or through other dynamic means as would occur to those skilled in the art. Indeed, the various operations, stages, conditionals, procedures, and routines of the present invention may be rearranged, substituted, combined, deleted, reordered, or otherwise modified as would occur to those skilled in the art.

In one embodiment, a method according to the present invention includes operating a computer system including several clients and several servers; generating an activation request with one of the clients for a software task that is being designated for distributed server execution; selecting two or more servers in response to the request based on data maintained about the servers by the one of the clients; interrogating the two or more servers with the one of the clients; providing the one of the clients server information corresponding to processing load for each of the two or more servers in response to this interrogation; and selecting one of the servers to execute the task as a function of the server information. One form of this method distributes processing load among a number of servers that collectively offer one or more web services. Such web services may or may not include distributed processing as an offering to its users. Alternatively or additionally, one or more network communications of this method may be implemented through a web service in other forms. In still other forms, web services may be utilized differently or may not be involved at all.

In another embodiment, a system of network computers includes a number of servers and a number of clients. The clients are each provided with a server selector and the servers are each provided with a server reporter. The server selector of any of the clients is operable to obtain server processing information from the server reporter of any of the servers. The server selector is responsive to an activation request for a software object designated for server execution by a corresponding one of the clients to select two or more servers to interrogate for the server processing load information based on data maintained by the server selector about the servers and designate one of the servers to execute the software object.

In a further embodiment, a computer system is operated including a number of clients and a number of servers. An activation request is generated with one of the clients for a software object to be executed by one of the servers and the servers are interrogated with the one of the clients in response to the request. An object pointer and server processing load information is provided to the one of the clients from one of the servers in response to this interrogation.

In yet a further embodiment, a computer system including a number of clients and a number of servers is operated and an activation request is generated by one of the clients for a routine to be executed by one of the servers. The servers are interrogated by this client in response to the request, and provided information from each of the servers in response. This information corresponds to availability of the routine. One of the servers is selected to execute the routine in accordance with the information.

In yet another embodiment, a computer system including several clients and several servers is operated and a first one of the clients requests execution of a software task. Two or more servers are selected in response to the request based on data maintained about the servers by a web service. Two or more servers are interrogated by the web service, providing the web service information corresponding to processing load in response. The web service selects one of the servers to execute the task as a function of the information.

In another embodiment, a system of networked computers includes a number of servers and a number of clients. The clients each have access to a server selector web service and the servers are each provided with a server reporter. The server selector web service is operable to obtain server processing load information from the server reporter of any of the servers. The server selector web service is responsive to a client activation request for a software object designated for server execution by one of the clients to select two or more servers to interrogate for the server processing load information based on data maintained by the server selector web service about the servers. The server selector web service designates one of the servers to execute the software object based on the information. In another embodiment, the server reporter is also a web service.

In yet another embodiment, a system of networked computers includes a number of servers and a number of clients. The clients each have access to a server selector service and the servers are each provided with a server reporter. The server selector service is operable to receive a client activation request by one of the clients over standard internet protocols and to obtain server processing load information from the server reporter of any of the servers. The server selector service is responsive to the client activation request for a software object designated for server execution to select two or more servers to interrogate for the server processing load information based on data maintained by the server selector service about the servers. The server selector service designates one of the servers to execute the software object in response to the information.

In another embodiment, web services are used for implementing additional features of the system 338 than just the selector service 460 and/or the server broker/reporter agent 462. In other embodiments, web services implement some or all aspects of system 20 and/or procedure 70, routine 160, routine 230, and/or routine 320. In yet further embodiments, system 20 and/or 338, procedure 70, routines 160, 230, and/or 320 are utilized to distribute processing load among processors providing one or more web services; where such web services may or may not offer distributed processing to its users.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention defined by following claims are desired to be protected.

What is claimed is:

1. A method, comprising:
   operating a computer system including several clients and several servers;
   requesting execution of a software task with a first one of the clients;
   selecting two or more servers in response to the request based on data maintained about the servers by a web service;
   interrogating the two or more servers with the web service;
   providing the web service information corresponding to processing load for each of the two or more servers in response to said interrogating; and
   selecting one of the servers to execute the task as a function of the information.

2. The method of claim 1, wherein the data corresponds to one or more prior server interrogations.

3. The method of claim 1, further comprising:
   requesting server execution of a software object with the web service from a second one of the clients;
   selecting a subset of the servers with the web service based on server data maintained by the web service, the server data being determined from one or more prior server interrogation responses;
   providing the web service a number of server characteristics each corresponding to server processing load for a different member of the subset in response to said requesting; and
   designating one member of the subset to execute the software object in accordance with the server characteristics.

4. The method of claim 1, wherein the computer system includes a host computer with a telephone switch coupled to a telephone network, and further comprising:
   controlling the telephone switch with the host computer; and
   directing a telephone call to a telephone associated with one of the clients during said controlling.

5. The method of claim 1, further comprising measuring response time of each of the number of servers to said interrogating to at least partially determine processing load.

6. The method of claim 1, wherein the data maintained by the web service includes a plurality of estimates each corresponding to processing load for a different server.

7. The method of claim 6, further comprising adjusting one of the estimates corresponding to the one of the servers selected to execute the task to reflect a processing load increase.

8. The method of claim 6, further comprising adjusting one of the estimates to reflect a decrease in processing load in response to passage of a selected time interval determined relative to a most recent interrogation of a corresponding one of the servers.

9. The method of claim 1, further comprising:
executing an application program with the web service, the software task being an object belonging to an object class selected for distributed processing among the servers;
intercepting the activation request from a nominal processing flow;
directing the activation request to a distribution routine of the web service; and
wherein the information corresponds to a number of current bids to execute the object, the current bids each being from a different one of the two or more servers, the data corresponds to bid estimates for the servers, and the two or more servers selected for said interrogating correspond to the lowest bid estimates.

10. A system of networked computers, comprising:
a number of servers; and
a number of clients, the clients each having access to a server selector web service and the servers each being provided with a server reporter, the server selector web service being operable to obtain server processing load information from the server reporter of any of the servers; and
wherein the server selector web service is responsive to a client activation request for a software object designated for server execution by one of the clients to select two or more servers to interrogate for the server processing load information based on data maintained by the server selector web service about the servers and designate one of the servers to execute the software object.

11. The system of claim 10, wherein the server reporter of each of the servers includes means for bidding on the execution of the software object.

12. The system of claim 10, wherein the server selector web service includes means for generating a number of estimates each representative of server processing load and each corresponding to a different one of the servers.

13. The system of claim 10, wherein the server selector web service is operable to maintain the data to indicate which of the servers has the capability to execute the software object.

14. The system of claim 10, wherein the server selector web service is operable to base the data on one or more prior interrogations of one or more of the servers.

15. The system of claim 10, wherein the clients and the servers each reside on a different one of the networked computers, and at least one of the networked computers includes a telephone switch coupled to a telephone network and a telephone associated with one of the clients.

16. The system of claim 10, wherein the server reporter is operable to return a pointer to an instance of the software object if a corresponding one of the servers has a processing load below a predefined threshold.

17. A system of networked computers, comprising:
a number of servers; and
a number of clients, the clients each having access to a server selector web service on a first server and a server reporter web service on a second server, the server selector web service being operable to obtain server processing load information from the server reporter web service; and
wherein the server selector web service is responsive to a client activation request for a software object designated for server execution by one of the clients to select two or more servers to interrogate for the server processing load information based on data maintained by the server selector web service about the servers and designate one of the servers to execute the software object.

18. The system of claim 17, wherein the first server and the second server are the same.

19. A system of networked computers, comprising:
a number of servers; and
a number of clients, the clients each having access to a server selector service and the servers each being provided with a server reporter, the server selector service being operable to receive a client activation request by one of the clients over standard internet protocols and to obtain server processing load information from the server reporter of any of the servers; and
wherein the server selector service is responsive to the client activation request for a software object designated for server execution to select two or more servers to interrogate for the server processing load information based on data maintained by the server selector service about the servers and designate one of the servers to execute the software object.

* * * * *

UNITED STATES PATENT AND TRADEMARK OFFICE
CERTIFICATE OF CORRECTION

| | | |
|---|---|---|
| PATENT NO. | : 7,117,244 B2 | Page 1 of 1 |
| APPLICATION NO. | : 10/233024 | |
| DATED | : October 3, 2006 | |
| INVENTOR(S) | : Florman et al. | |

It is certified that error appears in the above-identified patent and that said Letters Patent is hereby corrected as shown below:

On title page item 73
    In the Assignee information on the front cover, please change "Indianapolis, ID (US)" to --Indianapolis, IN (US)--

Signed and Sealed this

Twelfth Day of December, 2006

JON W. DUDAS
*Director of the United States Patent and Trademark Office*